US006641423B1

(12) United States Patent
Giro

(10) Patent No.: US 6,641,423 B1
(45) Date of Patent: Nov. 4, 2003

(54) ANCHORING SYSTEM FOR BOX OF CONNECTORS MOUNTED IN SERVICE BOXES

(75) Inventor: Santiago Ferrer Giro, Valls (ES)

(73) Assignee: Lear Automotive (EEDS) Spain, S.L., Valls (ES)

( * ) Notice: Subject to any disclaimer, the term of this patent is extended or adjusted under 35 U.S.C. 154(b) by 0 days.

(21) Appl. No.: 10/048,787

(22) PCT Filed: Aug. 4, 2000

(86) PCT No.: PCT/ES00/00312

§ 371 (c)(1),
(2), (4) Date: Jun. 6, 2002

(87) PCT Pub. No.: WO01/11728

PCT Pub. Date: Feb. 15, 2001

(30) Foreign Application Priority Data

Aug. 6, 1999 (ES) .......................................... 9902114 U

(51) Int. Cl.[7] .................................................. A01R 4/50

(52) U.S. Cl. ....................................... 439/347; 439/157

(58) Field of Search ................................ 439/347, 157, 439/166, 266, 372

(56) References Cited

U.S. PATENT DOCUMENTS

| | | | | |
|---|---|---|---|---|
| 5,613,879 A | | 3/1997 | Fontenau et al. | |
| 5,674,090 A | | 10/1997 | Sumida et al. | |
| 5,681,175 A | * | 10/1997 | Busse et al. | 439/347 |
| 5,871,363 A | * | 2/1999 | Kimura | 439/157 |
| 6,168,445 B1 | * | 1/2001 | Seutschinker et al. | 439/157 |

FOREIGN PATENT DOCUMENTS

| | | |
|---|---|---|
| FR | 2687509 | 8/1993 |
| JP | 8047142 | 2/1996 |

* cited by examiner

*Primary Examiner*—P. Austin Bradley
*Assistant Examiner*—Briggitte R. Hammond
(74) *Attorney, Agent, or Firm*—Sughrue Mion, PLLC

(57) ABSTRACT

Anchoring system for connector boxes in service boxes, configured by two parallel sliding elements which can move with respect to the box of connectors; each sliding element includes a series of inclined guides which are arranged in parallel to each other.

4 Claims, 2 Drawing Sheets

ANCHORING SYSTEM FOR BOX OF CONNECTORS MOUNTED IN SERVICE BOXES

This application is a 371 of PCT/ES00/00312 filed Aug. 4, 2000. The disclosure of which is incorporated herein by reference.

An anchoring system for connector boxes in service boxes.

The present patent application consists, as its title indicates, of an "Anchoring system for connector boxes in service boxes", whose new characteristics of construction, shape and design fulfill the object for which it has specifically been planned, with maximum safety and effectiveness.

Electrical connectors are arranged in a connector box which essentially comprises a housing made of an appropriate insulating material inside which electrical terminals are provided, for example of the type called fast-connection electrical terminals. Inside, said housing comprises a plurality of divisions which define cavities through which the corresponding cables pass.

There are different ways of coupling an electrical connector box with the corresponding service box. One way is by mounting the connector box by pressure on said service box. Another way of coupling an electrical connector box in the service box consists of using a sliding body provided with inclined side guides, which slides inside said connector box, so that when the operator introduces said sliding body in the connector box, the inclination of the guides causes said connector box to anchor in the service box, as the former is forced to fit onto the latter.

In Japanese patent number JP8047142, a structure of coupling connector to electrical connection box is disclosed. In this document a plurality of connectors are mounted on a connector holding member in such a manner that the connectors can be freely attached and detached, by forming guide pins on the connector holding member, fitting the pins in guide ways, and turning a lever to move the connectors in such a direction as to fit them into the connector holding member.

These ways of mounting an electrical connector box on a service box have different drawbacks. Firstly, mounting the connector box by manual pressure on the service box is neither necessary nor effective. Indeed, on many occasions there is a large number of elements to be connected in the service box and, therefore, to couple the electrical connector box in said service box requires a great effort to be used. In order to avoid damaging the service box, for example in the case that the connector box has not been fitted in such a way that the elements of both boxes coincide correctly, in practice it is advisable to set a limit to the force that the operator must exert on the connector box to couple it in the service box in a safe and effective way.

A body provided with inclined side guides which slide inside the connector box and whose movement causes the latter to anchor, ensures that the connectors fit correctly into the box. This is due to the fact that said side guides correctly position the connectors and guide them into the anchoring of the same with respect to the service box. However, when the service box is made up of a large number of connection elements, it is still necessary to apply great force to anchor or release the connector box. Moreover, incorporation of these side guides inside the connector box means an increase in the outer dimensions of the unit, which is not desirable from a functional point of view. Nor is the incorporation of these side guides inside the connector box desirable from a construction point of view, since sometimes the thickness of the walls of the connector box is reduced in order to be able to house said side guides conveniently.

To resolve the above-mentioned drawbacks, the system for anchoring connector boxes in service boxes of the present invention has been developed.

Thus, one object of the invention is to guide the connector into its anchoring in the service box to ensure that in said operation no elements of the service box are damaged.

Another object of the invention is to provide an anchoring system that is capable of adequately mounting the connector box on the service box, with the connectors perfectly positioned and coinciding with the service box, regardless of the number of elements present in said service box.

In general terms, the system of anchoring connector boxes in service boxes which is the object of the present invention, is made up of two parallel sliding elements which can move with respect to the connector box. Each sliding element includes a series of inclined guides arranged conveniently parallel to each other.

The peculiarity of the system of the present invention lies in the fact that it comprises a lever element which is mounted and articulated at the same time on the connector box and on the free ends of the sliding elements. In this way, the swivelling of said lever element towards the connector box, caused by the operator applying a minimal force, makes the sliding elements move, and as a result causes the connector box to anchor in the service box thanks to the inclination of said guides. The lever element incorporated in the anchoring system of the invention allows a reduction in the amount of force the operator has to apply to the connector box to mount it on the service box thus contributing to a simpler and faster mounting.

From a construction point of view, the lever element has an operating surface which extends perpendicularly in side wings. Said side wings are conveniently provided with projections which are adapted to be housed and to slide inside the slots formed at the free ends of said sliding elements. Said side wings of the lever element also include lower orifices which serve to house projections provided in the connector box. The operating surface is conveniently designed so that the operator applies a minimal force to the same to mount the connector box on the service box. In this sense, when the operator moves the lever element towards the connector, it turns around said projections in the connector box. The projections of the lever element slide in turn along the slots in the ends of the sliding elements, thus causing the connector box to anchor in the service box.

In accordance with another advantageous feature of the anchoring system of the present invention, the two sliding elements described above are appropriately mounted so that they slide along the outside of the connector box. The inclined guides of said sliding elements can move between projections provided in the sides of the connector box. In this way, said wall of the connector box is able to be substantially thicker than those of the connector boxes used for the same purpose in the prior art, which gives greater rigidity to the same. This increase in thickness of the connector box wall is possible due to the fact that the structure of the service box itself co-operates with the movement of said guides thanks to the projections mentioned above, in contrast to conventional connector boxes which require additional walls provided with projections to allow said guides to move inside the connector box.

The invention also provides for the incorporation of blocking means of the lever element with respect to the connector box in order to ensure permanent anchoring. Said blocking means of the lever element are preferably made up of side protuberances which are provided in the lever element. These side protuberances are coupled in complementary holding flanges provided in the connector box when the lever body is in anchoring position, that is, in the position in which the connector box is coupled in the service box.

The features and advantages of the system for anchoring connector boxes in service boxes which is the object of the present invention, will be made clearer in the detailed description of a preferred embodiment of said anchoring system. Said description will be given, from here on, by way of non-restrictive example, with reference to the drawings which accompany it, in which.

Figure 1:
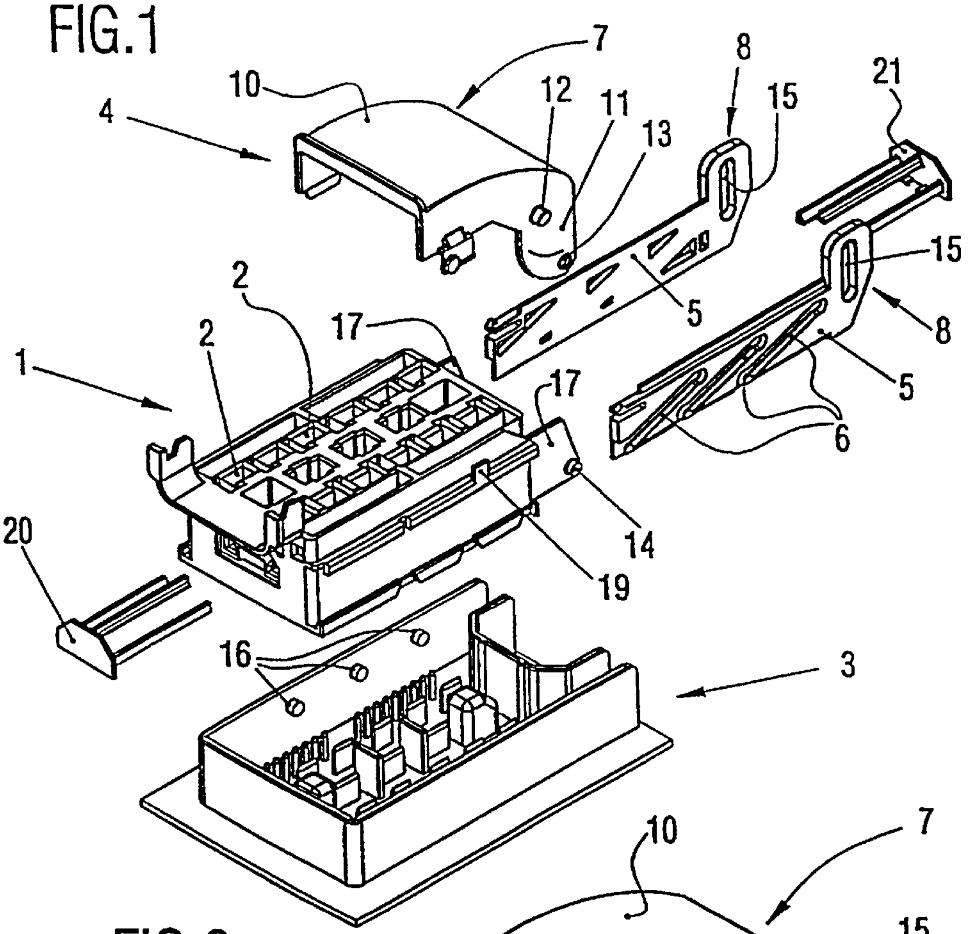
FIG. 1 is an exploded view in which we represent an electrical assembly made up of a connector box, a service box and an anchoring system in accordance with the present invention.

The elements which appear in the attached figures are the following: (1) connector box, (2) cavities in the connector box, (3) service box, (4) anchoring system, (5) sliding elements, (6) inclined guides, (7) lever element, (8) free ends of the sliding elements, (9) swivelling direction of the lever element towards the anchoring position, (10) operating surface of the lever element, (11) wings of the lever element, (12) projections of the lever element, (13) orifices of the lever element, (14) projections of the connector box, (15) slots of the sliding elements, (16) projections of the service box, (17) wall of the connector box, (18) protuberances of the lever element, (19) flanges of the walls of the connector box and (20, 21) holding elements of the terminals in the connector box.

In the figures, a connector box (1) may be observed, consisting of a housing of insulating material inside which cavities (2) are provided which house fast-connection electrical terminals. The connector box (1) is designed to be coupled to the service box which has been designated in FIGS. 1 and 2 by the reference number (3) and serves to centralise all the electrical connections, for example the electrical connections of a vehicle.

To couple the connector box (1) in the service box (3) an anchoring system (4) is arranged in accordance with the present invention. Said anchoring system (4) is made up of two parallel sliding elements (5) which can move with respect to the connector box (1). Each sliding element (5) includes, as may be observed in FIGS. 1 and 3, a series of three inclined guides (6) which are parallel to each other. The system (4) of the invention incorporates a lever element (7) which is mounted and articulated to the connector box (1) and to the free ends (8) of the sliding elements (5).

When the operator swivels the lever element (7) in the direction of the arrow (9), that is towards the connector box (1), applying a minimal force to the operating surface (10) of said lever element (7), this causes the connector box (1) to anchor in the service box (3), as will be described in detail below.

Figure 2:
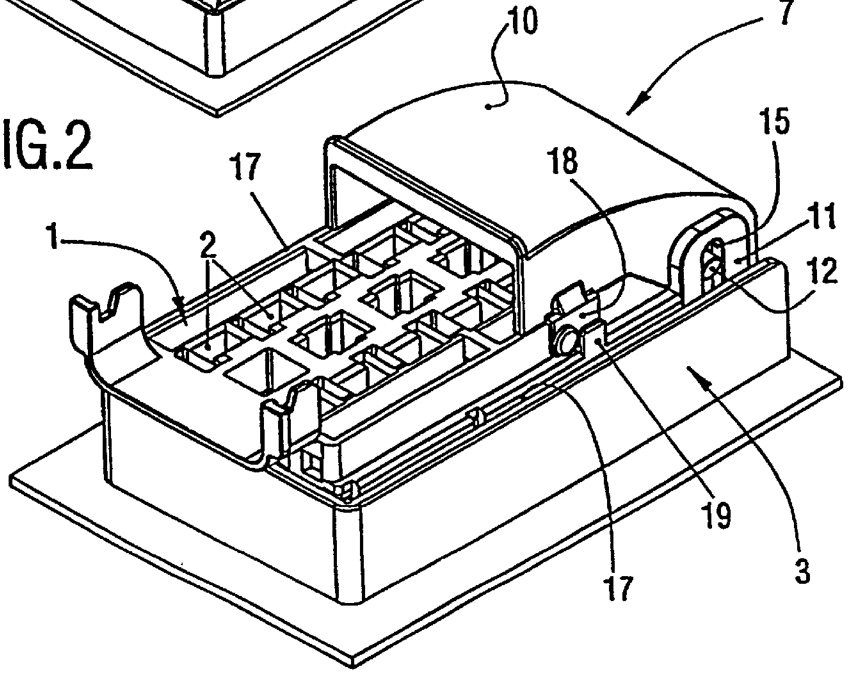
FIG. 2 is a perspective view illustrating the assembly of FIG. 1 but mounted and with the system of the invention in coupled position.

The operating surface (10) of the lever element (7) is curved and extends perpendicularly downwards in wings (11) which are provided with a pair of projections (12) and a pair of lower orifices (13). Said lower orifices (13) are intended to house complementary projections (14) provided in the connector box (1), as shown in FIG. 1. The projections (12) are designed to be housed and to slide in slots (15) provided in the free ends (8) of the wings (11) of said sliding elements (5).

The anchoring system (4) operates as follows: the operator actuates the lever element (7) in the direction of the arrow (9), making it swivel around the projections (14) of the connector box (1). The projections (12) of the lever element (7) slide along the slots (15) of the ends (8) of the sliding elements (5). This causes said elements (5) to slide with respect to the connector box (1), thanks to inclined guides (6) which are supported by projections (16) provided in the inner part of the sides of the service box (3). Operating the lever element (7) causes the inclined guides (6) to orientate the connector box (1) towards the anchoring position in the service box (3). It is clear that the inclination of the guides (6) causes the anchoring of both elements, which is very simple thanks to the lever arm provided by the element (7) which, as may be observed, depends on the vertical distance between points (12) and (14) represented in FIG. 3.

The sliding elements (5) slide advantageously on the outside of the connector box (1) so that the wall (17) of the connector box (1) is sufficiently thick to obtain great rigidity.

Figure 3:
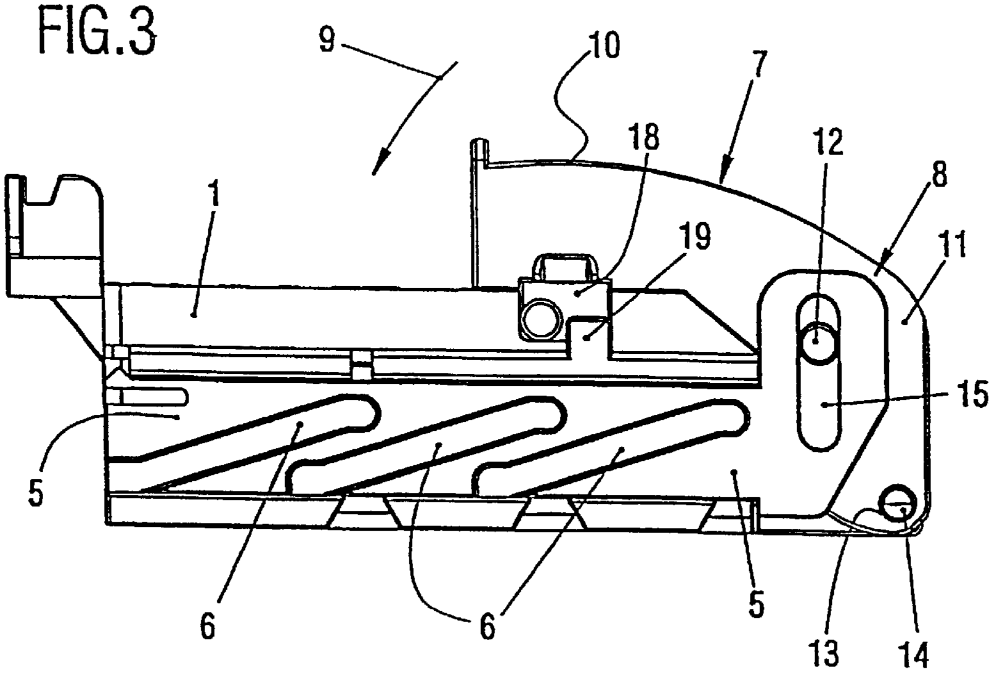
FIG. 3 is a side elevational view of the anchoring system of the invention.
Figure 4:
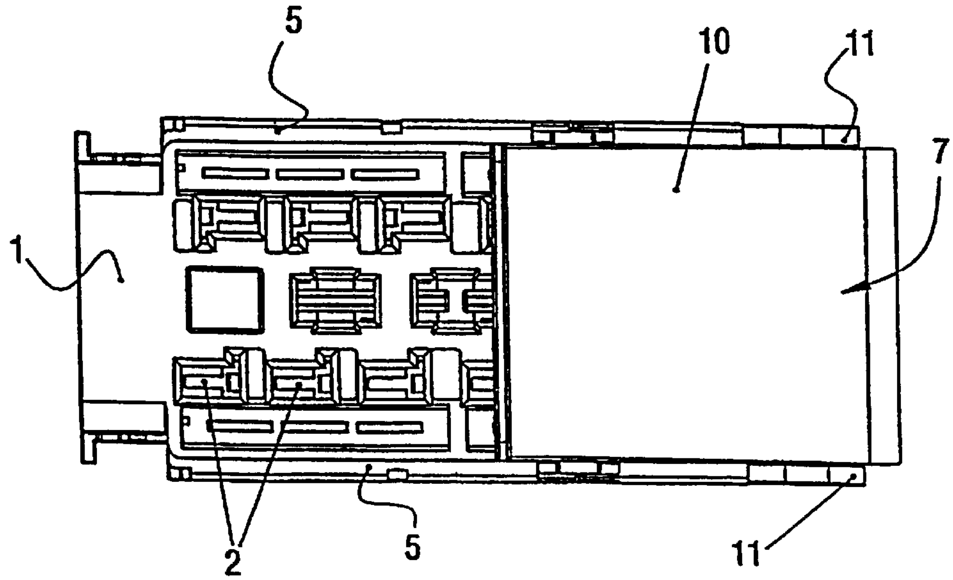
FIG. 4 is a plan view of the anchoring system of the invention, in accordance with FIG. 3.

To ensure the permanent anchoring of the connector box (1), means are provided for blocking the lever element (7) with respect to said connector box (1). Said blocking means are made up, in accordance with the invention, of side protuberances (18) which, as may be observed in FIG. 1, are provided in the lever element (7), projecting sideways from the operating surface (10) and downwards. These side protuberances, designated by the reference (18), are coupled to complementary holding flanges (19) which are provided in the connector box (1), projecting upwards with respect to each side wall (17) of the same. The coupling of the lever element (7) as described, is shown in FIG. 3, in which said lever body (7) may be observed in the anchoring position, that is, in the position in which the connector box (1) is coupled in the service box (3), with said protuberances also coupled in the flanges (19), thus preventing the relative movement of the sliding elements (5).

In accordance with FIG. 1 of the drawings, the connector box (1) is provided with a pair of holding elements, designated by the reference numbers (20) and (21), which serve to hold in position the terminal situated in each of the cavities (2) of said connector box (1). Said holding elements (20, 21) have the object of ensuring that the terminals do not move, even if the latter are not correctly placed or if for any reason they have broken inside the cavity (2).

The materials of the elements which make up the anchoring system of the invention, as well as the shapes, dimensions and other accessory elements, may conveniently be replaced by others which are technically equivalent, provided they do not depart from the essential nature of the present invention, nor from the inventive concept of the same as defined in the claims included below.

What is claimed is:

1. An anchoring system for connector boxes in service boxes, which consists of a connector box (1) and a service box (3) connected by two parallel sliding elements (5) suitable to move with respect to the connector box (1), including in each sliding element (5) a plurality of parallel inclined guides (6), characterised in that said connector box (1) comprises an articulated lever element (7) also mounted articulated in free ends of said parallel sliding elements (5) which slide along an outside of the connector box (1), sliding the inclined parallel guides (6) along projections (16)

in an inner part of sides of the service box (3), in such a way that swivelling said lever element (7) towards the connector box (1) moves the sliding elements (5), causing the connector box (1) to anchor in the service box (3).

2. An anchoring system for connector boxes in service boxes in accordance with claim 1, characterised in that the lever element (7) has an operating surface (10) which extends perpendicularly in side wings (11) which are provided with a pair of projections (12) which are housed and slide in slots (15) in the free ends (8) of said sliding elements (5), and provided with lower orifices (13) intended to house projections (14) in the connector box (1), so that when the lever element (7) is moved towards the connector box (1), it turns around said projections (14) of the connector box (1) and the projections (12) of the lever element (7) slide in said slots (15) of the sliding elements (5), causing the connector box (1) to anchor in the service box (3).

3. An anchoring system for connector boxes in service boxes in accordance with claim 1, characterised in that it comprises means (18, 19) for blocking the lever element (7) with respect to the connector box (1).

4. An anchoring system for connector boxes in service boxes in accordance with claim 3, characterised in that said blocking means are made up of side protuberances (18) in the lever element (7), which couple in complementary holding flanges (19) in the connector box (1).

* * * * *